(12) United States Patent
Zisapel et al.

(10) Patent No.: US 8,842,578 B1
(45) Date of Patent: Sep. 23, 2014

(54) END-TO-END (E2E) APPLICATION PACKET FLOW VISIBILITY

(71) Applicants: Yehuda Zisapel, Tel Aviv (IL); David Aviv, Tel Aviv (IL)

(72) Inventors: Yehuda Zisapel, Tel Aviv (IL); David Aviv, Tel Aviv (IL)

( * ) Notice: Subject to any disclaimer, the term of this patent is extended or adjusted under 35 U.S.C. 154(b) by 0 days.

(21) Appl. No.: 13/890,271

(22) Filed: May 9, 2013

(51) Int. Cl.
*H04L 12/28* (2006.01)
*G06F 15/177* (2006.01)

(52) U.S. Cl.
USPC .......................................... 370/255; 709/222

(58) Field of Classification Search
USPC ........... 370/253, 367, 396, 400; 709/223–226
See application file for complete search history.

(56) References Cited

U.S. PATENT DOCUMENTS

| | | | | |
|---|---|---|---|---|
| 7,161,942 | B2 * | 1/2007 | Chen et al. ..................... | 370/392 |
| 7,962,602 | B1 * | 6/2011 | Peterson et al. ............... | 709/223 |
| 8,494,543 | B2 * | 7/2013 | Koodli et al. .................. | 455/453 |
| 2004/0010570 | A1 * | 1/2004 | Kaler et al. .................... | 709/220 |
| 2007/0177518 | A1 * | 8/2007 | Li et al. .......................... | 370/252 |
| 2008/0225748 | A1 * | 9/2008 | Khemani et al. ............... | 370/254 |
| 2009/0161544 | A1 * | 6/2009 | Kelly et al. ..................... | 370/232 |
| 2009/0238111 | A1 * | 9/2009 | Hirano et al. .................. | 370/328 |
| 2010/0177646 | A1 * | 7/2010 | Kobayashi ..................... | 370/252 |
| 2010/0188990 | A1 * | 7/2010 | Raleigh ......................... | 370/252 |
| 2010/0287262 | A1 * | 11/2010 | Elzur ............................. | 709/220 |
| 2011/0213869 | A1 * | 9/2011 | Korsunsky et al. ............ | 709/223 |
| 2012/0195197 | A1 * | 8/2012 | Popa et al. ..................... | 370/235 |
| 2012/0275573 | A1 * | 11/2012 | Lehane et al. ............. | 379/32.01 |
| 2013/0086631 | A1 * | 4/2013 | Archer et al. ..................... | 726/1 |
| 2013/0282895 | A1 * | 10/2013 | Ko et al. ........................ | 709/224 |

* cited by examiner

*Primary Examiner* — Warner Wong
(74) *Attorney, Agent, or Firm* — A. C. Entis-IP Ltd

(57) ABSTRACT

A method of generating an end-to-end (E2E) profile that characterizes an E2E application packet flow (E2E-APF) path between first and second applications respectively hosted on first and second communication devices and exchanging information over a plurality of communication networks, the method comprising: acquiring communication device data associated with at least one of the first and second communication devices; determining an E2E-APF path traversing the plurality of networks over which packets comprising the exchanged information propagate; acquiring quality of service (QoS) data for at least two of the plurality of networks that the E2E-APF path traverses; and generating an E2E-APF profile, optionally comprising a QoE, responsive to the QoS and communication device data, and the E2E-APF path.

47 Claims, 4 Drawing Sheets

END-TO-END (E2E) APPLICATION PACKET FLOW VISIBILITY

FIELD

Embodiments of the invention relate to visibility of packet flow between communicating applications.

BACKGROUND

Modern communication networks support large, varied, and growing populations of users and an ever increasing gamut of user services and user applications. The networks span not only global populations and geography but a plethora of methods, devices, infrastructures, and protocols for propagating data, voice, and video content. Messages that not long ago were propagated over relatively small geographic distances and were confined to single networks are now regularly delivered from a source to a destination by a plurality of communication networks that cooperate to deliver the messages often over distances that cross national and international borders. The cooperating networks may be provided by different service providers, operate using different communication protocols, and be based on different physical layer infrastructures.

As the various software and hardware resources that support the networks, configure paths along which network packets propagate in the networks, and provide services mediated by the networks have become more sophisticated, the resources have become fungible and logically abstracted away from their particular physical structures. Resources, such as switches, routers, processors, and computers that communicate with each other over a communication network may be replaced by abstract network resources implemented in software, substantially independent of their tangible structures. The resources may be configured by software to communicate and cooperate with each other as needed to form a network element (NE), which may be addressed and communicated with via the network to implement a particular network task. Such a software constructed entity is conventionally referred to as a "virtual" entity, and the process of constructing such an entity is referred to as "virtualization". A virtual network entity may function as any of various network elements, and may for example be a virtual router, virtual switch, or virtual firewall. Upon completion of its task the virtual entity may be disassembled and its component resources "returned" and made available to the network to be reconfigured and provide another desired virtual network entity.

Servers that are connected to communication networks to provide data, services and/or applications to network users may also be "virtualized". Virtual servers may comprise a configuration of resources provided by a plurality of computers that are configured and managed by software referred to as a "hypervisor", to emulate a physical computational resource, which emulation may be referred to as a virtual machine (VM). A single physical computer may be configured to host a plurality of virtual machines that are controlled by a hypervisor to manage computer hardware resources and provide services for various applications and programs.

The advent and development of virtualization has stimulated and extended software control of networks and development of Software Defined Networking (SDN) tools that enable a centralized network operating system (NOS) to directly configure physical or virtual network elements substantially in real-time to shape network traffic. The OpenFlow protocol is an example of software for provisioning a NOS to define a network by software. Another form of virtualization of network and service functions takes the form of network functions virtualization. The fact that network elements can run as virtual appliances utilizing commercial off the shelf (COTS) hardware provides an efficient way of implementing new virtual networks and services.

To exemplify the complexity of modern services and their networking demands consider a user using a communication device to access a plurality of services via a communication network to which the device is connected. The user communication device may be any device that the user uses to connect to and communicate via a communication network, and may by way of example, be a laptop, desktop computer, workbook, tablet, smartphone, or personal digital assistant (PDA). For each service a different application comprised in or accessed by the communication device may function to communicate with a dedicated physical server or VM that provides the service. The applications supporting the services may simultaneously be engaged in communication sessions with different servers to enable the user to simultaneously participate in a number of different activities. Among the multiplicity of activities that may be enabled by the applications are by way of example: listening in real-time to music streamed from a server; browsing the Internet; accessing and responding to email on a mail server; engaging in instant messaging (chat) conversations; conversing via voice over IP; drafting a document; using a word processor hosted on a cloud-based server; accessing information from a database; and/or employing business applications hosted in an enterprise headquarters or cloud datacenter.

The transmission of information between an application on the user's communication device and the server providing a service desired by the user is mediated by sequences of data packets that are transmitted between the communication device and the server over the network or networks that connect them. The transmitted sequences of data packets, conventionally referred to as packet traffic flow or simply packet flow, may propagate over different paths of network elements, over various wireless and wired communication channels, and network segments to provide an "end-to-end" (E2E) path that connects the user communication device and the server. The E2E path is generally not static and may change over time due to network loading and reconfiguration, even if the user and servers are geographically fixed. Of course the user may be mobile, connecting in turn to various access networks, and applications running on servers may be dynamically migrated to alternative servers as requirements and/or server computational demand fluctuates. The user's communication device and the server are located at terminal points or "endpoints" of the E2E path that connects them and may be referred to as endpoint communication devices, or endpoint devices, optionally modified where appropriate by "user". The users may also be referred to as "end-users".

In order to maintain end-user application and service at acceptable levels of performance, a complex set of tools is deployed to monitor, process, and display parameters that characterize network and server operation. Network performance is conventionally measured by Quality of Service (QoS) parameters, which may for example comprise availability, packet loss, and round-trip delay. A QoS parameter is an objective parameter that may measure a feature of packet transport such as packet loss, corruption, or delay over network paths. Server performance is generally measured by objective parameters referred to as key performance indicators, (KPIs). A KPI may for example provide a measure of a real or virtual CPU load or memory utilization. User satisfaction with network performance and operation of an application supported by the network is conventionally measured by a figure of merit referred to as Quality of Experience (QoE). QoE is a subjective measure that typically requires using satisfaction surveys or focus groups to calibrate and normalize user feelings of "like" and "dislike" with regard to objective parameters of network performance.

Network QoS parameters are commonly measured using Performance Monitoring Operations, Administration, and Maintenance tools, such as the Two Way Active Measurement Protocol (TWAMP) [RFC 5357] and the Ethernet OAM (Operations, Administration and Management) suite defined in ITU-T Recommendation Y.1731. Network QoS parameters may be reported from point of measurement back to a central site using protocols such as Cisco NetFlow, IP Flow Information Export (IPFIX) [IETF RFC 5101], and Simple, Network Management Protocol (SNMP) [IETF STD 62]. Datacenter KPIs are collected by the hypervisors monitoring the VMs and are reported using mechanisms such as OpenStack "Horizon" or Amazon "CloudWatch".

SUMMARY

An aspect of an embodiment of the invention relates to providing and making visible a holistic, relatively fine granularity, time dependent profile that characterizes an E2E path in a network or networks over which packets flow in a session between applications running on, or associated with, endpoint communication devices connected by the path. An E2E path for the application session may be referred to as an E2E application path and a profile for the E2E application path, in accordance with an embodiment of the invention, may be referred to as, an "E2E Application Packet Flow profile" (E2E-APF profile).

In an embodiment, the E2E-APF profile comprises holistic and relatively fine granularity "APF data" that a network management system (NMS), network operating system (NOS) or data orchestration system may access to understand and optionally interact with the network or networks which the E2E application path traverses. Making the E2E-APF profile visible enables access to the APF data. Making the E2E path visible may comprise providing optionally substantially real-time "visibility snapshots" of the E2E application packet flow path as a function of time. A visibility snapshot at a given "snapshot" time comprises a presentation of E2E-APF data for the given snapshot time. A visibility snapshot presentation may comprise a computer readable data stored in a memory, a visual, or an audible presentation. A visual presentation may comprise an image and/or text.

Holistic APF data may comprise data for parameters associated with at least one of the endpoint communication devices, at least one of the session applications, and/or segments and/or network elements along the segments of the network or networks that the E2E path traverses between the endpoint devices. Relatively fine granularity APF data may comprise data for both physical and logical parameters associated with the segments, the segment network elements, endpoint devices, and session applications. The APF data may comprise data for at least one network segment and its associated network elements, for each of a plurality or all of the networks through which the E2E path passes. The APF data may comprise at least one or any combination of QoS parameters, KPIs, and a QoE for the E2E Application path.

Whereas the E2E path of an application path flow may change over time as the number, identity, and order of network elements which it traverses change, that E2E path is in general "tethered" to the endpoint communication devices, which may comprise a virtual machine, at which the E2E path terminates, and on which the application software is running. Hereinafter, APF data for parameters associated with the endpoint communications devices may be referred to as "APF tethered data". APF data associated with segments of the E2E application path between the endpoint devices may be referred to as "APF path data" or "path data". Tethered data may comprise any combination of KPIs and identifiers (IDs), for endpoint communication devices. Endpoint communication device identifiers may by way of example comprise an identity (ID) of a user of the endpoint device, and/or a MAC address, and/or a network address (which might represent a virtual entity), and/or an endpoint device KPI. The AP path data may, comprise data associated with network elements and/or communication links connecting network elements. By way of example, AP path data may comprise an optionally ordered list of identifiers for network elements, such as switches, routers, and hubs along the E2E path, information typically contained in routing tables or network configuration or management systems, or packet delay or loss exhibited by a link between network elements.

An aspect of the invention relates to providing a system, hereinafter also referred to as an "E2E-APF Profiler" that generates a holistic, fine granularity E2E-APF profile and visibility snapshots for an E2E application path between endpoint devices hosting applications communicating with each other in a session via the E2E application path. The E2E-APF Profiler optionally comprises a data "Collector", an "Assembler", an E2E-APF database, an E2E-APF Profile Engine, and a "Visibility Projector".

The Collector optionally operates to acquire, fine granularity, tethered data and path data for a portion of the E2E application path in each network and/or physical and/or virtual service element cooperating to provide the E2E application path. The Collector may use any reporting protocols or reporting agents comprised in network elements of the cooperating networks and the endpoint devices to acquire tethered and path data.

Tethered data and path data acquired by the Collector for a given E2E application path from each of the cooperating networks is generally acquired at different times from many different network elements and/or network management systems (NMS), any two of which may monitor different sets of KPI parameters, accumulate values for KPIs over different integration periods, and communicate using different protocols. The data for the given E2E application path may be mixed with data from other than the given E2E application path. The Assembler receives the data from the Collector and identifies data associated with a same E2E application path at substantially a same time and processes the data identified for the given E2E application path to provide synchronous data sets for the given E2E application path that may be used to provide visibility snapshots of the E2E application path at different times. The assembler optionally stores the synchronized data in the E2E-APF database. The E2E-APF Profile Engine processes the data stored in the E2E-APF database for the E2E path to provide an E2E-APF profile for the E2E application path which the visibility projector uses to provide visibility snapshots of the E2E path.

There is therefore provided in accordance with an embodiment of the invention a method of generating an end-to-end (E2E) profile that characterizes an E2E application packet flow (E2E-APF) path between first and second applications respectively hosted on first and second communication devices and exchanging information over a plurality of communication networks, the method comprising: acquiring communication device data associated with at least one of the first and second communication devices; determining an E2E-APF path traversing the plurality of networks over which packets comprising the exchanged information propagate; acquiring quality of service (QoS) data for at least two of the plurality of networks that the E2E-APF path traverses; and generating an E2E-APF profile responsive to the QoS and communication device data, the E2E-APF path, and the QoE.

Optionally the method comprises using the communication device and QoS data to estimate a quality of experience (QoE) for operation of at least one of the first and second applications. Additionally or alternatively, the communication device data optionally comprises identification data useable to provide an identity for at least one of the first and second applications.

Optionally, the method comprises detecting QoE degradation and initiating diagnostics to determine a fault or faults in one of the communication devices or networks traversed.

In accordance with an embodiment of the invention, the communication device data comprises identification data useable to provide an identity for at least one of the first and second communication devices.

In accordance with an embodiment of the invention, the communication device data comprises a value for a key performance indicator (KPI) of the computational resources of at least one of the communication devices. Optionally the method comprises acquiring values for a KPI from an orchestration system associated with at least one of the first and second communication devices.

In accordance with an embodiment of the invention, the communication device data comprises user identification data useable to provide an identity for a user of the first or second communication device.

In accordance with an embodiment of the invention, determining an E2E-APF path comprises determining a network segment that the E2E-APF path traverses in each of the at least two networks. Optionally, determining an E2E-APF path comprises determining a network segment in each of the plurality of networks that the E2E-APF path traverses.

In accordance with an embodiment of the invention, determining the E2E-APF path comprises tracing a path along which packets propagate through the plurality of networks from the first communication device to the second communication device. Optionally, tracing the path comprises acquiring data logically associated with a plurality of planes into which the network may be logically decomposed. Additionally or alternatively, tracing the path optionally comprises acquiring routing data for a network element in the plurality of networks and using the routing data to trace of the path. In an embodiment of the invention, tracing the path optionally comprises determining which of the acquired data is associated with the E2E-APF path. Optionally the method comprises determining which of the data associated with the E2E-APF path is associated with a same temporal instance of the E2E-APF path.

In accordance with an embodiment of the invention, acquiring QoS data comprises acquiring QoS data from a network element in the networks of the plurality of networks that the E2E-APF path traverses. Optionally, acquiring QoS data comprises acquiring QoS data from a network element in each of the networks of the plurality of networks that the E2E-APF path traverses.

In an embodiment of the invention, acquiring QoS data comprises acquiring QoS data from a network management system, or a network operating system in a network of the plurality of networks that the E2E-APF path traverses.

In an embodiment of the invention, the method comprises updating the E2E-APF profile.

In accordance with an embodiment of the invention, the method comprises making the E2E-APF profile visible. Optionally visibility may be obtained by use of a graphical representation.

In an embodiment of the invention, the method comprises monitoring changes in the QoE and performing diagnostic operations on the networks responsive to a change indicating degradation in the QoE. Optionally performing diagnostic operations comprises determining a segment of the E2E-APF path causing the degradation. Optionally the method comprises highlighting the segment.

There is further provided in accordance with an embodiment of the invention, a method of monitoring a plurality of networks, the method comprising: generating E2E-APF profiles in accordance with an embodiment of the invention for each of a plurality different E2E-APF paths comprising E2E-APF paths between different pairs of applications; and making the E2E-APF profiles visible. Optionally the method comprises correlating E2E-APF profiles associated with different E2E-APF paths. Optionally, correlating comprises correlating QoS data associated with different E2E-APF profiles. Additionally or alternatively, correlating optionally comprises correlating QoE data associated with different E2E-APF profiles.

In an embodiment of the invention, correlating comprises determining a network path segment common to at least two E2E-APF paths and correlating QoS or QoE data associated with the E2E-APF profiles of the at least two E2E-APF paths. In an embodiment of the invention, correlating comprises distinguishing dependence of QoE for different applications associated with the E2E-APF profiles on communication device data or QoS data. In an embodiment of the invention, correlating comprises determining statistical behavior of the plurality of networks. In an embodiment of the invention, the method comprises using the E2E-APF profiles to configure different packages of user services for offer to users of the plurality of networks. In an embodiment of the invention, making visible comprises making information comprised in the E2E-APF profile accessible to a network manager, management system, or operating system. In an embodiment of the invention, making visible comprises providing a visual or audio presentation of information comprised in the E2E-APF profile. In an embodiment of the invention, making visible comprises receiving data identifying a portion of the information comprised in the E2E-APF profile and making the portion visible.

In an embodiment the method comprises monitoring changes in the QoE and performing diagnostic operations on the networks responsive to a change indicating degradation in the QoE.

There is further provided in accordance with an embodiment of the invention, a system for providing end-to-end (E2E-APF) profiles that characterize E2E-APF paths that support packet flows session between applications hosted on communication devices and exchanging information over a plurality of communication networks, the system comprising: a data collector configured to acquire communication device data associated with the communication devices and path data associated with network elements and/or communication links connecting network elements along E2E-APF paths that traverse at least two of the plurality of networks between communication devices at endpoints of the E2E-APF paths; an assembler configured to receive and process the data from the collector to identify communication device and path data associated with a same instance of an E2E-APF path; an E2E-APF profile engine that processes the data associated with the E2E-APF path to provide an E2E-APF profile for the E2E-APF path; and a visibility projector configured to make data in the E2E-APF profile accessible for use in monitoring or managing the networks. Optionally an E2E-APF profile generated by the system is associated with a user application and the E2E-APF profile comprises a QoE for performance of the application.

In an embodiment, the E2E-APF profile engine is optionally configured to detect QoE degradation and initiate diagnostics to detect faults in communication devices and/or network segments.

In an embodiment, the E2E-APF profile engine is optionally configured to correlate E2E-APF profiles associated with different E2E-APF paths. Optionally, correlating comprises correlating QoS data associated with different E2E-APF profiles. Additionally or alternatively correlating comprises correlating QoE data associated with different E2E-APF profiles. In an embodiment correlating comprises determining a network path segment common to at least two E2E-APF paths and correlating QoS or QoE data associated with the E2E-APF profiles of the at least two E2E-APF paths. In an embodiment correlating comprises distinguishing dependence of QoE for different applications associated with the E2E-APF profiles on communication device data or QoS data. In an embodiment correlating comprises determining statistical behavior of the plurality of networks.

In the discussion, unless otherwise stated, adjectives such as "substantially" and "about" modifying a condition or relationship characteristic of a feature or features of an embodiment of the invention, are understood to mean that the condition or characteristic is defined to within tolerances that are acceptable for operation of the embodiment for an application for which it is intended. Unless otherwise indicated, the word "or" in the description and claims is considered to be the inclusive "or" rather than the exclusive or, and indicates at least one of, or any combination of items it conjoins.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

Figure 3:
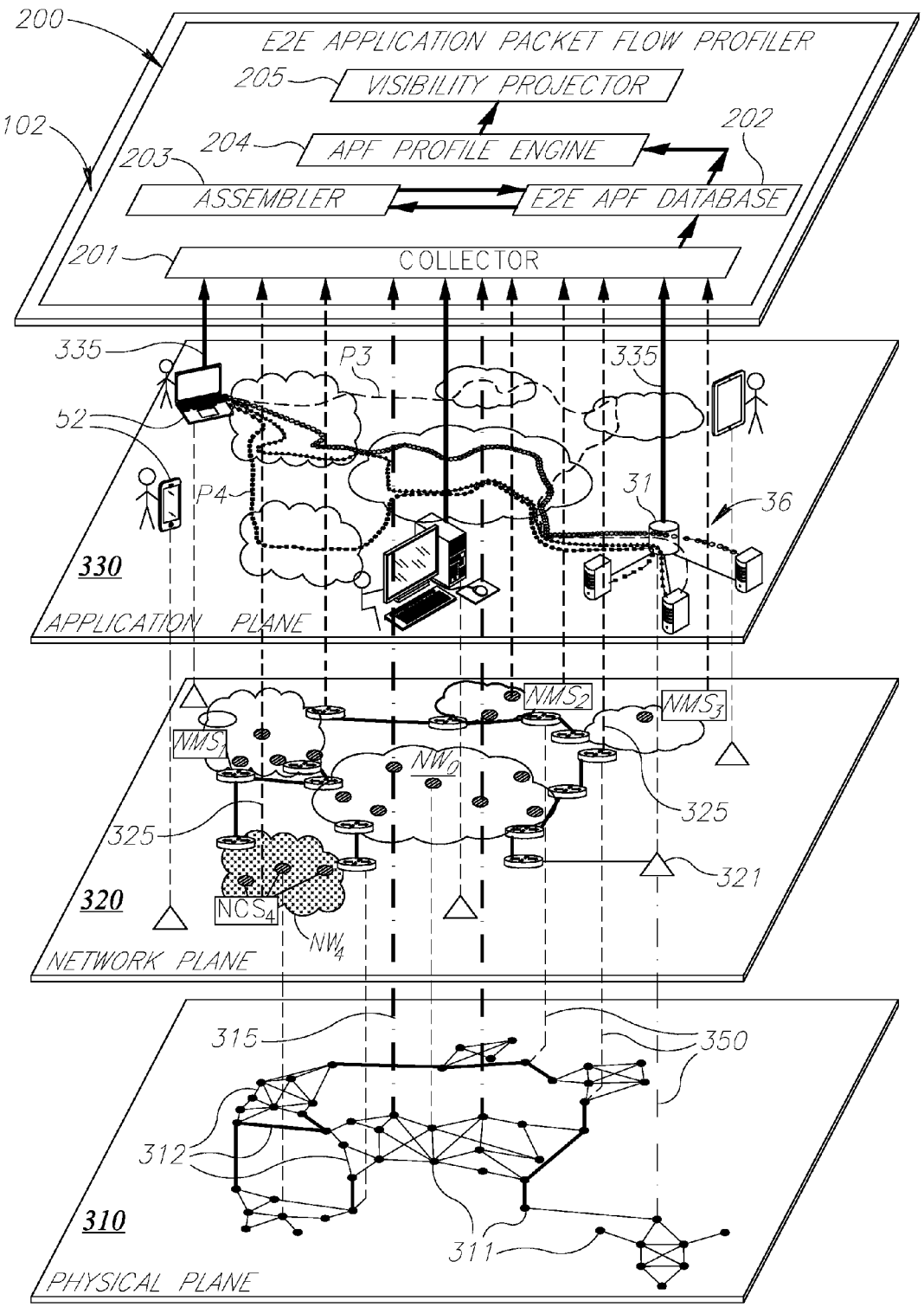
FIG. 3 schematically illustrates the E2E-APF Profiler shown in FIG. 2 acquiring tethered and path data from different physical and logical planes of the communication networks traversed by the E2E paths shown in FIG. 1 and FIG. 2, in accordance with an embodiment of the invention.
Figure 4:
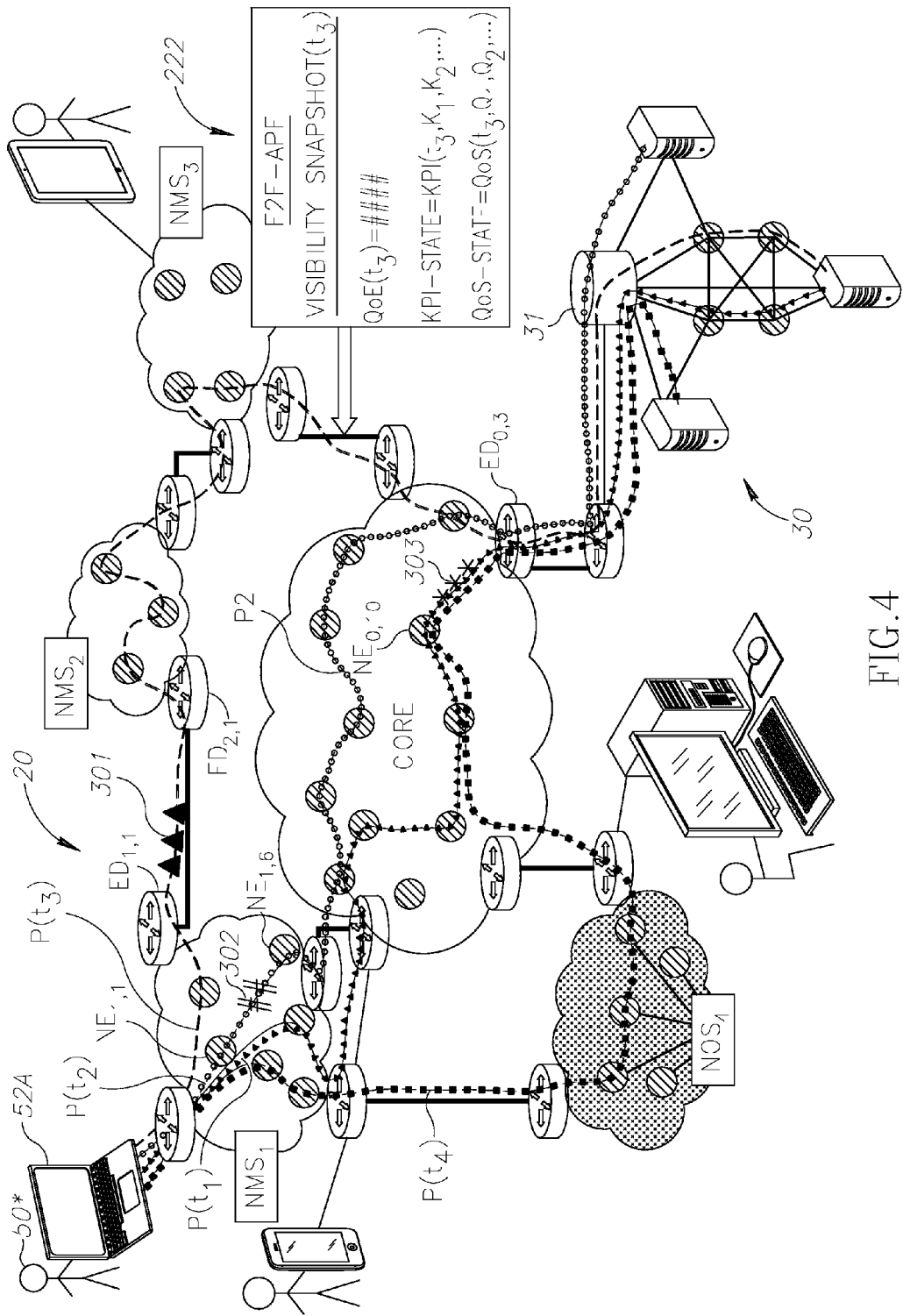
FIG. 4 schematically shows a visibility snapshot for an E2E application path provided by the E2E-APF Profiler shown in FIG. 2, in accordance with an embodiment of the invention.

In the following detailed description, features and operation of a conventional configuration of communication networks is described with reference to FIG. 1. Monitoring and control of the networks and examples of E2E application paths supported by the networks are discussed with reference to the figure. Monitoring the network schematically shown in FIG. 1 by an E2E-APF Profiler in accordance with an embodiment of the invention to provide E2E-APF profiles, for E2E application paths traversing the networks is discussed with reference to FIG. 2. Acquisition of tethered and path data by the E2E-APF Profiler from different physical and logical planes of the communication networks shown in the figures is schematically illustrated in FIG. 3 and discussed with reference to FIG. 3. FIG. 4 schematically shows visibility snapshots of the E2E application paths provided by the E2E-APF Profiler.

Figure 1:
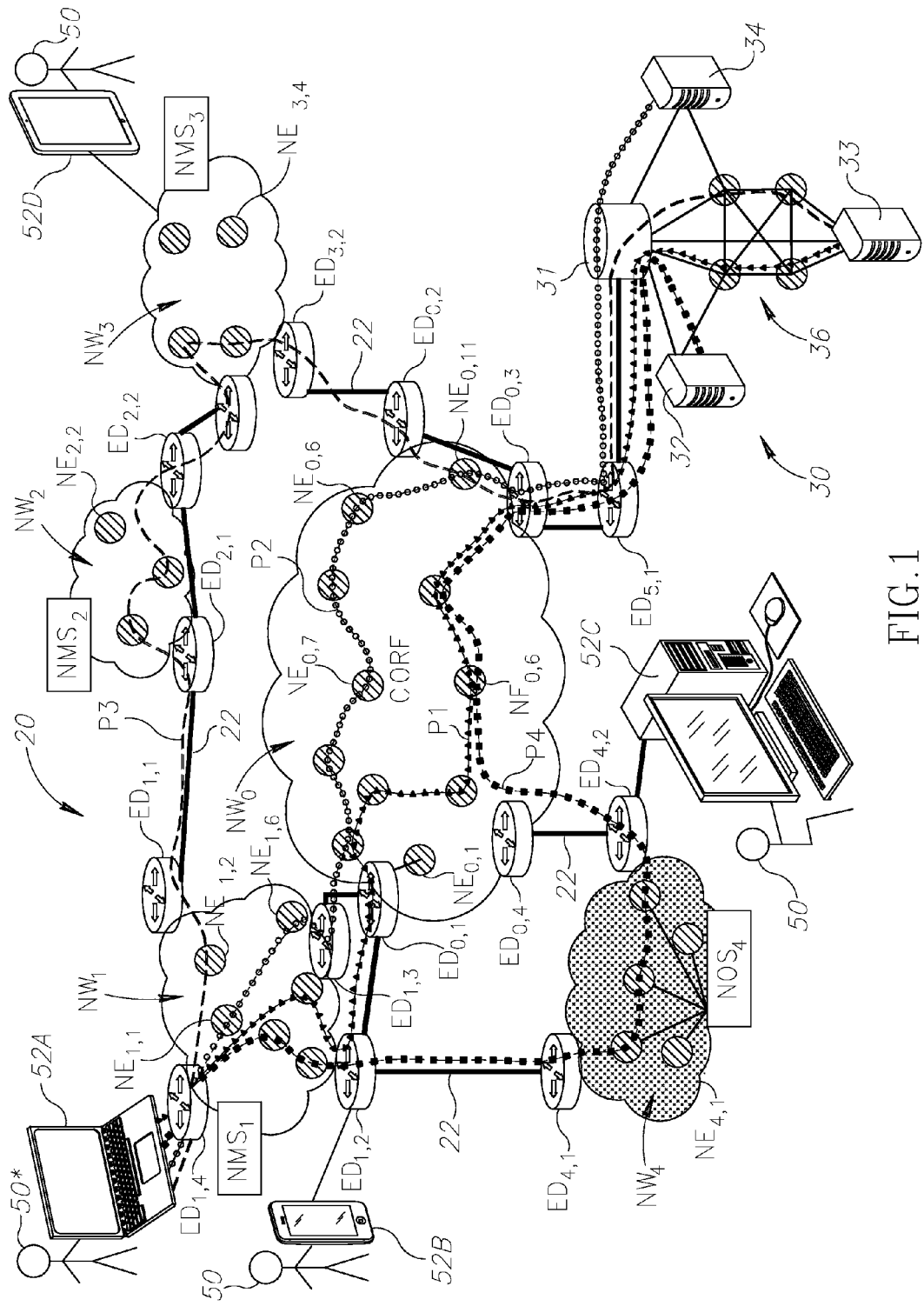
FIG. 1 schematically shows a configuration of communication networks supporting E2E application paths for an application packet flow between a source communication device operated by a user and a destination server.

FIG. 1 schematically shows a configuration 20 of a plurality of N access communication networks $NW_n$ ($1 \leq n \leq N$) that provide communication services to a plurality of users represented by icons 50. By way of example, N is equal to 4 in FIG. 1. The number of users 50 shown in FIG. 1 and their respective connections to networks $NW_n$ are arbitrary and chosen for convenience of presentation.

Access networks $NW_n$ are connected to each other and to a core backbone network $NW_o$ (which may be the public Internet) by suitable edge devices $ED_{n,m}$, where the subscript m indicates an m-the edge device of an n-th network $NW_n$. Edge devices $ED_{n,m}$, which may for example comprise edge routers or switches, are connected by suitable wired or wireless communications channels 22 configured to support communication protocols of the networks to which they connect and to provide bandwidth for communication traffic between the networks. For convenience of presentation, the edge devices are represented in FIG. 1 and figures that follow by router icons.

Each network $NW_n$ ($0 \leq n \leq N$, that is, including core network $NW_o$) comprises a plurality of network elements $NE_{n,j}$ ($1 \leq j \leq J_n$, where $J_n$ is equal to a number of network elements in the n-th network $NW_n$) connected by any of various wire or wireless communication channels 22. The number of NEs $J_n$ shown in FIG. 1 for a given network $NW_n$ is arbitrary, and to prevent clutter only some of the NEs and communication channels 22 are labeled. In practice, a number of NEs in a network $NW_n$ may be different from that shown in FIG. 1.

Network element $NE_{n,j}$ in a given network $NW_n$, comprises equipment for receiving packets in a packet flow propagating from a source communication device and forwarding the packets over a suitable path in the given network towards a destination communication device for which the packets are intended. The source or the destination communication device may be directly connected to the given network $NW_n$ or to another of networks $NW_n$ that is connected to the given network $NW_n$ by an edge device $ED_{n,m}$. Network elements for forwarding packets may be dedicated physical equipment such as routers or switches, or may be virtual elements configured and controlled by software. Typically, NEs in a network populate and/or have access to forwarding tables, commonly referred to as Forwarding Information Bases (FIBs), to determine how to forward packets. In conventional IP networks FIBs may be populated using distributed routing protocols. In Software Defined Networks (SDNs), forwarding behavior may be programmed from a central SDN controller responsive to a Network Operating System (NOS). Network elements $NE_{o,j}$ comprised in core network $NW_o$ are relatively high bandwidth capacity NEs connected by relatively high capacity channels (not shown) for propagating large packet flows between access networks $NW_n$ (n≤1). Any network element may be implemented as a physical device or may be virtualized as and exist solely in software.

A network $NW_n$ may comprise a network management system $NMS_n$ that monitors and optionally controls components of the network, and provides measurements of QoS for the network. For a network $NW_n$ that is at least partially software defined, network elements $NE_{n,j}$ in the network may be programmed as needed by a controller that may reside in a network management system $NMS_n$ or a network operating system (NOS). In FIG. 1 and figures that follow networks $NW_n$, for (1≤n≤3) are by way of example, conventional networks and shaded network $NW_4$ is assumed to be an SDN network controlled by a network operating system $NOS_4$.

Each access network $NW_n$ (n≤1), provides communication services to users 50 that are customers of network $NW_n$. These services may include by way of example, Internet access, VPN connectivity, connection to email, file transfer, instant messaging, VoIP, cloud-based applications, etc. A given user 50 may connect to a network $NW_n$ by any of various user communication devices. In FIG. 1, exemplary user communication devices that may be used to connect a user to a network $NW_n$ are schematically shown as a laptop 52A, a smartphone 52B, a desktop computer 52C, and a tablet 52D. The user communication devices 52A, . . . , 52D are referred to generically as user communication devices 52.

By way of example of operation of network configuration 20, FIG. 1 schematically shows networks $NW_n$ supporting an E2E path for an application packet flow between laptop 52A that a particular user 50 designated user 50\* operates to connect with and download files from a file transfer server 30. File server 30 may be a virtual server comprising a load balancer 31 that manages real computers 32, 33 and 34 to optionally store, and provide users 50 who access the server, with files. Computers 31-34 may communicate among themselves via a subnet 36. An IP address of load balancer 31 functions as an IP address of server 30. User 50\* may be attempting to download movie files from file server 30.

To download the files, user 50\* operates laptop 52A to connect optionally to access network NW. Laptop 52A optionally connects to network $NW_1$ at an edge device $ED_{1,4}$ of network $NW_1$. Upon establishing connection, user 50\* opens an application, in this example a file transfer protocol (FTP), and inputs a request to the FTP application to connect with server 30 and download the desired files. Packets that carry user 50\*'s request are generated by the FTP application with an IP destination address of server 30 and propagate from laptop 52A via edge device $ED_{1,4}$ to network element $NE_{1,1}$ in network $NW_1$. Network element $NE_{1,1}$ uses its FIB to decide to forward the packets over a communication link to $NE_{1,6}$ in $NW_1$. Network element $NE_{1,6}$ forwards the packets over a link to edge device $ED_{1,3}$ which transmits the packets to backbone core network $NW_o$ via edge router $ED_{0,1}$.

Upon receipt of packets from $NW_1$, NEs in core network $NW_o$ forward the packets across the core network to an edge router $ED_{0,3}$ which forwards the packets to a router $ED_{5,1}$. Edge router $ED_{5,1}$ optionally forwards the packets directly to their destination at server 30 by forwarding the packets to load balancer 31 at the IP address of the load balancer.

The NEs and links in networks $NW_n$ which packets traverse from source communication device laptop 52A to destination communication device server 30 define an E2E path "P1" that passes through a selection of networks $NW_n$ over which the packets flow from the laptop to the server. In establishing path P1 for the application packet flow, NEs in each network $NW_n$ along the path may forward packets in accordance with forwarding information bases (FIBs) responsive to network topology, management policy, traffic loads, operational status of NEs of the network, available bandwidth on links between NEs, packet delays and/or loss between NEs, and other QoS parameters. Packets generated by server 30 carrying content for the requested files may propagate back to laptop 52A over path P1.

However, as conditions in networks $NW_n$ change during the FTP session between laptop 52A and server 30, the path supporting the application packet flow may change over time. Whereas the paths are always tethered to laptop 52A connected to access network $NW_1$ and server 30, over time they may traverse different networks $NW_n$ and different NEs in the networks. The application packet flows may for example be routed over exemplary E2E paths P2, P3, P4. For each path, each network management system $NMS_n$, or $NOS_4$ for SDN network $NW_4$, may acquire QoS parameters for a portion of the path that passes through the respective network $NW_n$ associated with the NMS or NOS.

Figure 2:
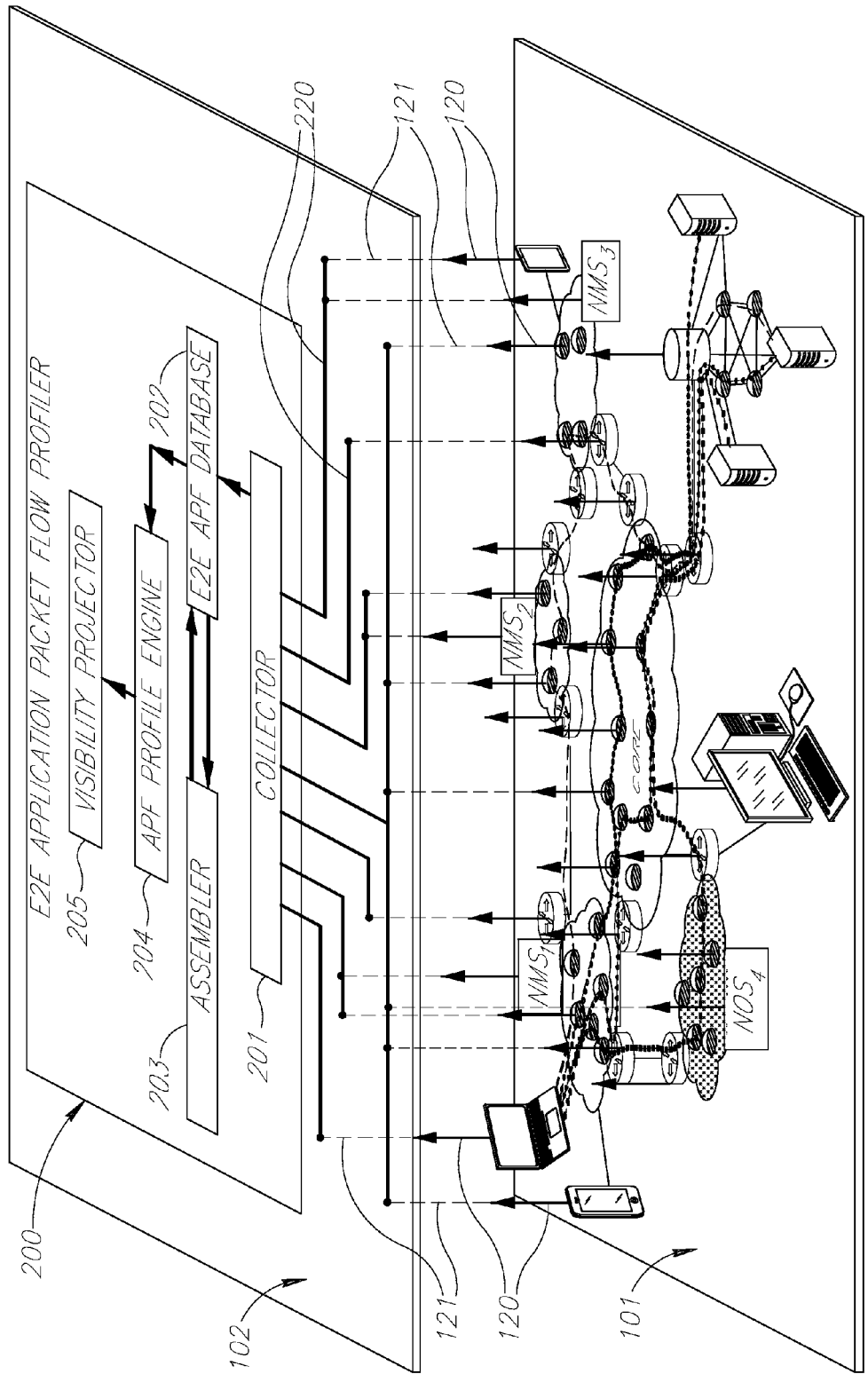
FIG. 2 schematically shows a E2E-APF Profiler operating to provide E2E-APF profiles for the E2E application paths shown in FIG. 1, in accordance with an embodiment of the invention.

FIG. 2 schematically shows an E2E-APF Profiler 200 monitoring traffic through networks $NW_n$ to provide application packet flow profiles (APF profiles) for E2E application paths supporting packet flows between endpoint communications devices using the networks. Networks $NW_n$ are schematically shown as located on a network plane 101 and E2E-APF Profiler 200 is schematically shown residing on a management plane 102 located above network plane 101.

In an embodiment of the invention, E2E-APF Profiler 200 comprises a Collector 201 that acquires APF data for the E2E application paths. The APF data comprises tethered data associated with the endpoint devices of the E2E application paths and APF path data associated with portions of the E2E application paths between the endpoint devices. In an embodiment APF tethered and path data acquired for a given E2E application path determine the E2E path and may be sufficient to determine portions of the E2E path in each of a plurality or all of the networks through which the E2E path passes.

Collector 201 acquires APF path data by communicating with interfaces to the endpoint device, network management systems $NMS_n$, and $NOS_4$ to which it has been given access, and/or by directly communicating with monitoring agents that may be hosted in the endpoint devices and NEs along the E2E application paths. The interfaces and monitoring agents, hereinafter generically referred to as "reporting agents", that provide APF path data to Collector 201 are schematically represented by arrows 120 pointing upwards to management plane 102 from network devices from which the path data originates. The APF data provided by a reporting agent 120 is transmitted to Collector 201 in data messages schematically represented by a dashed line 121. Data messages 121 may be time-stamped with times at which the data they contain is generated or acquired by reporting agents 120. APF data messages 121 are schematically indicated as input to Collector 201 via communication channels 220 in management plane 102.

Tethered data comprised in data messages 121 transmitted by a reporting agent 120 from an endpoint communication device of an E2E application path in networks $NW_n$ may comprise identification (ID) data, hereinafter "signature data" and KPI data for the endpoint device. Signature data optionally comprises at least one or any combination of ID data that identifies the endpoint communication device, the application hosted in the device communicating via the E2E application path and an ID for a user of the communication device. The communication device ID may for example comprise data identifying a type of communication device, a MAC address, a supplier serial number, an IP address, an IP socket (IP address and TCP port number), or an international mobile subscriber number (IMSI). A user ID may include a user name, or a password. An application identifier may comprise a destination IP address and port number. Note that such identifiers and addresses may not be physically contained in packets belonging to the application packet flow, and may be changed as the packets traverse the path. KPI data may comprise KPIs of computational elements supporting operation of the endpoint device such as CPU load, memory and storage usage, and network load to and from the computational element. In some cases Collector 201 may be pre-configured with device ID, or application identifiers, or choice of access network.

APF path data comprised in data messages 121 may comprise FIB data that describes how network elements $NE_{n,m}$ and edge routers $ED_{n,m}$ in networks $NW_n$ forward packets originating from a source device connected to a network $NW_n$ towards their respective destinations. Path data may also comprise QoS data, such as availability, available bandwidth, packet loss, packet delay, and delay variation for given segments of the E2E path.

Collector 201 optionally saves APF data it receives in data messages 121 as data entries in an E2E-APF database 202. Data entries stored in E2E-APF database 202 responsive to data messages 121 are in general associated with different E2E paths simultaneously active and supporting applications in networks $NW_n$. The different data entries will generally be time-stamped with different times and the tethered and/or path data they contain may be formatted in accordance with different data protocols. Since the path may be constantly changing, APF data may be updated sufficiently frequently to enable up-to-date determination of the path from one endpoint to the other, and to enable associating QoS parameters with the network segments traversed.

In an embodiment of the invention, an Assembler 203 may preprocess the received data to convert the data from the different formats in which they are received to a common format. Assembler 203 may preprocess the APF data entries in E2E-APF database 202 to sort and determine which entries are associated with a substantially same temporal instance of a given application packet flow responsive to signature data. Optionally, the Assembler labels sorted and associated APF data entries in APF database 202 with E2E-APF path identifiers so that APF data entries in the database belonging to same temporal instances of a same E2E-APF path may be associated and used to provide E2E-APF profiles and visibility snapshots for the E2E-APF path. In order to compensate for missing APF data or entries with different time-stamps, the Assembler optionally adjusts, for example, by suitable interpolation or averaging, APF data to provide a set of substantially simultaneous path data.

Assembler 202 may determine which APF data entries stored in APF database 202 are associated with a same temporal instance of a given E2E-APF path by tracing how packets propagate through networks $NW_n$ between first and second endpoint devices at first and second endpoints respectively of the given E2E path to determine the NEs through which the E2E path passes. APF data entries associated with the determined NEs and time stamped with a substantially same time may be associated with a same temporal instance of the given E2E-APF path.

Tracing for the given E2E-APF path may be accomplished by tracing packet propagation along the path from the first endpoint device, which may be a user communication device 52 or a server. An access network at which the first endpoint device connects to networks $NW_n$ may be identified using any of various techniques known in the art and/or by configuring the first endpoint device or edge devices $ED_{n,m}$ at which connections to access networks $NW_n$ ($1 \leq n \leq N$) are made to make knowledge of the connection available when the connection is made. Assembler 202 may then determine a next NE in networks $NW_n$ to which the access network edge device $ED_{n,m}$ forwards packets it receives from the first endpoint device. Assembler 202 may determine the next NE responsive to source and/or destination addresses contained in packets belonging to the application packet flow, FIBs in accordance with which NEs forward packets and/or routing information provided by management systems (for example an $NMS_n$) and/or or SDN controllers (for example, $NOS_A$) of networks $NW_n$. The "next NE" procedure may be iterated until the second endpoint device at the second endpoint of the E2E application path is reached.

An APF Profile Engine 204 optionally processes data entries in E2E-APF database 202 associated by Assembler 203 with different temporal instances of a same given E2E path to provide time dependent E2E-APF profiles and visibility snapshots for the E2E path. As noted above, APF data entries stored in E2E-APF database 202 will generally be time-stamped with different times. Whereas APF data entries associated with different temporal instances of a given E2E-APF path are expected to be time stamped with different times, in general APF data entries identified and labeled by Assembler 203 with a same given temporal instance of an E2E-APF path will not be labeled with a same time. Some of the APF data entries belonging to the given temporal instance of the E2E-APF path may be time-stamped with times earlier or later than other APF data entries belonging to the given instance, and some data advantageous for providing an E2E-APF profile and visibility snapshot for the given instance of the E2E path may be missing. Therefore, in an embodiment of the invention E2E-APF Profile Engine 204 adjusts, for example, by suitable interpolation or averaging, APF data entries sorted as belonging to a same instance of an E2E path to provide a set of substantially simultaneous APF data, for a time t of the instance. The adjusted data which may be referred to as "synchronized APF data" may be used to provide an E2E-APF profile and visibility snapshot that characterize the E2E-APF path at time t, referred to as noted above as a snapshot time t.

In an embodiment of the invention, APF Profile Engine 204 processes the synchronized APF data to estimate a QoE for the E2E-APF path and the particular application corresponding to the E2E-APF path. In general QoE may be estimated from the application type, the QoS parameters for the E2E-APF path, and the KPI parameters of the endpoint devices. QoS parameters used in determining QoE may be calculated as functions of QoS parameters for segments of the E2E path in a plurality or all of the networks that the E2E path traverses. It is noted that QoE for an application may be dependent on features of the application that characterize the application functioning or services that it may require. For example, a voice over internet protocol VoIP application may be substantially more sensitive to packet delay than a FTP application. A QoE for the VoIP application may therefore be substantially degraded by packet delay while a QoE for the FTP application may be substantially unaffected by packet delay.

In an embodiment of the invention E2E Application Packet Flow Profiler 200 comprises a visibility projector 205 that generates visual and/or audio presentations responsive to visibility snapshots provided by APF Profile Engine 204 to interface a user of E2E-APF profiler 200, with networks and activity on the networks that E2E-APF profiler 200 monitors.

Whereas in the above description all components of E2E Application Packet Flow Profiler 200 are schematically shown housed together, practice of the invention is not limited to "centralized" E2E-APF Profilers in which all or substantially all of the profiler components are comprised in a single device or located at a same location. An E2E-APF Profiler may have a distributed configuration with components at different locations. For example, Collector 201 may be a distributed collector having receiving components located at different and possibly widespread locations. Assembler 203 may be located at a first location while E2E APF Database 202 may be located at a second different location.

FIG. 3 schematically shows a decomposition of networks $NW_n$ shown in FIG. 2 into physical and logical planes and E2E APF Profiler 200 acquiring data from each of the planes to provide holistic relatively fine granulated APF data for E2E-APF profiles and visibility snapshots, in accordance with an embodiment of the invention. The decomposition optionally comprises three planes: a physical plane 310, a network plane 320 and an application plane 330. Profiler 200 is shown located on a management plane 102 located above planes 310-330.

Physical plane 310 represents network hardware nodes, such as optical transceivers, copper modems, RF transceivers, and repeaters in networks $NW_n$ by filled circles 311 and physical transmission links, such as optical fibers, twisted wire cables and radio links that connect the nodes by lines or edges 312. Network plane 320 comprises IP addressable entities, such as edge devices $ED_{n,m}$ that forward packets of data between networks $NW_n$ and IP addressed endpoint communication devices that connect to the networks. In network layer 320 triangles 321 represent endpoint communication devices, such as user communication devices 52 and server 30, which may be considered logically to be comprised in, and are shown in application plane 330. Application layer 330 comprises applications that communicate over networks $NW_n$, user communication devices 52 and servers, for example, server 36 that hosts the applications and the logical flow paths such as P1, P2, P3, P4 that support packet flow between the applications. Corresponding elements in planes 310, 320 and 330 are connected by thin dashed lines 350.

As noted above, APF Profiler 200 receives APF data for processing to provide APF profiles and visibility snapshots for E2E-APF paths in networks $NW_n$ from, optionally the physical and each of the logical planes that the networks may be understood to comprise. FIG. 3 schematically shows E2E APF Profiler 200 receiving APF data from physical plane 310, network plane 320 and application plane 330. Arrows 315, 325, and 335 respectively represent transmission of APF data from elements in physical plane 310, network plane 320, and application plane 330. The arrows extend from elements in the planes that are the sources of the APF data to Collector 201 in E2E-APF Profiler 200.

It is noted that acquiring APF data from a plurality of different networks and network layers as schematically illustrated in FIG. 3 may require establishing a set of agreements with individual network operators to enable access to operating and management information for their respective networks. In an embodiment of the invention an E2E-APF Profiler such as Profiler 200, operating on the bases of such agreements, may provide the operators party to the agreements with services that may be advantageous to their own respective networks. For example, networks may cooperate to offset QoS performance to allow a first network to lower QoS on some of its links to balance a high QoS in a second network.

FIG. 4 shows a very schematic graphic presentation of visibility snapshots generated by E2E-APF Profiler 200 responsive to APF data that it receives from layers 310, 320 and 330 for an application packet flow between user 50* and virtual server 30, traversing networks $N_{Wn}$ schematically shown in FIGS. 1 and 3 and discussed above. The figure graphically shows E2E paths $P_{(t1)}$, $P_{(t2)}$, $P_{(t3)}$, and $P_{(t4)}$ between user 50*'s laptop 52A and server 36 at snapshot times $t_1, t_2, t_3$, and $t_4$ respectively. Optionally, as shown in FIG. 4 the E2E paths are overlaid on a graphical map of networks $N_{Wn}$ that shows icons representing network devices, such as network elements $N_{En,j}$ and edge routers $E_{Dn,m}$ that the networks comprise.

In accordance with an embodiment of the invention, in the visibility snapshot at a snapshot time $t_k$, E2E-APF Profiler 200 may show or be queried to show graphically or textually a $QoE(t_k)$ that the E2E-APF profiler determines for the E2E path between user 50*'s laptop 52A and server 36, responsive to APF data that it has acquired. Optionally, the visibility snapshot provides a KPI-STATE($t_k$) and/or a QoS-STATE($t_k$) for the E2E path at time $t_k$. Optionally KPI-STATE($t_k$) is displayed as a vector or other data array having components $K_1, K_2, \ldots$ that provide measures of KPI parameters for the user application hosted on user 50*'s laptop 52A and/or the application hosted in server 36 with which the user application is communicating over the E2E path. QoS-STATE ($t_k$) may be displayed as a vector or other data array comprising various QoS parameter for segments of the E2E path and corresponding global QoS parameters determined from the segment QoS parameters. In an embodiment of the invention visibility projector 205, may show or be queried to show graphically or textually local QoS-STATE($t_k$)s and/or KPI-STATE($t_k$)s for selected segments of displayed E2E paths and servers that might be connected to the segments.

For example, in FIG. 4 visibility projector 205 schematically displays a visibility snapshot table 222 for a snapshot time $t_3$ that shows $QoE(t_3)$, KPI-STATE($t_3$), and QoS-STATE ($t_3$) for E2E application path $P(t_3)$. The visibility snapshot also shows a segment of E2E application path $P(t_3)$ between $ED_{1,1}$ and $ED_{2,1}$ having delta icons 301 to indicate that the segment exhibits a relatively large packet delay. The visibility projector schematically indicates with ladder icons 302 that a segment of E2E application path $P(t_2)$ between network elements $NE_{1,1}$ and $NE_{1,6}$ at snapshot time $t_2$ is experiencing aberrant packet loss. And for a segment of E2E application paths $P(t_1)$ and $P(t_4)$ between $NE_{0,10}$ and router $ED_{0,3}$ at snapshot times $t_j$ and $t_3$ respectively the visibility projector schematically indicates with asterisk icons 303 that the trajectories are exhibiting a relatively large packet loss rate. It is noted that E2E-APF profiles in accordance with an embodiment of the invention, and visibility snapshots responsive to the E2E-APF profiles may be sensitive to correctable minor degradations that may be difficult to detect using standard QoS measures.

Time dependent visibility snapshot displays similar to those shown in FIG. 4 provide a time dependent spatial and holistic E2E-APF profile of activity in networks $NW_n$ that supports the application packet flow between user 50* and server 30. Association and display of local QoS-STATE($t_k$)s and possibly local KPI-STATE($t_k$)s for selected segments of E2E trajectories in networks $NW_n$ provides the E2E-APF profile with fine granularity.

It is noted that whereas FIG. 4 schematically shows a graphical user interface (GUI) of data generated by E2E-APF Profiler 200 responsive to APF data to provide a time dependent E2E-APF profile for a single application packet flow traversing networks $NW_n$, the E2E-APF Profiler may simultaneously provide and make visible time dependent E2E-APF profiles for a plurality of application packet flows traversing these same networks. In an embodiment of the invention, the E2E-APF Profiler correlates information in E2E-APF profiles to determine similarities or differences in the dependencies of QoEs of applications. In an embodiment, the E2E-APF Profiler 200 processes data in E2E-APF profiles to accumulate statistical data relevant to performance of networks $NW_n$ useable to predict functioning of the networks subject to different configurations of applications communicating via the networks.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method of generating an end-to-end (E2E) profile that characterizes an E2E application packet flow (E2E-APF) path between first and second applications respectively hosted on first and second communication devices and exchanging information over a plurality of communication networks, the method comprising:
    acquiring communication device data associated with at least one of the first and second communication devices;
    tracing an E2E-APF path traversing the plurality of networks over which packets comprising the exchanged information propagate by determining a network segment that the E2E-APF path traverses in each of two different networks of the plurality of networks that the E2E-APF path traverses;
    performing a measurement in each of at least two of the plurality of networks that the E2E-APF path traverses to acquire quality of service (QoS) data;
    generating an E2E-APF profile responsive to the QoS and communication device data, and the E2E-APF path.

2. The method according to claim 1 wherein generating an E2E-APF profile comprises using at least one of the first or second communication device and QoS data to determine a quality of experience (QoE) estimate for operation of at least one of the first and second applications.

3. The method according to claim 1 wherein the communication device data comprises identification data useable to provide an identity for at least one of the first and second applications.

4. The method according to claim 1 wherein the communication device data comprises identification data useable to provide an identity for at least one of the first and second communication devices.

5. The method according to claim 1 wherein the communication device data comprises a value for a key performance indicator (KPI) for at least one of the communication devices.

6. The method according to claim 5 and comprising acquiring values for a KPI from an orchestration system associated with at least one of the first and second communication devices.

7. The method according to claim 1 wherein the communication device data comprises user identification data useable to provide an identity for a user of the first or second communication device.

8. The method according to claim 1 wherein tracing an E2E-APF path comprises determining a network segment in each of the plurality of networks that the E2E-APF path traverses.

9. The method according to claim 1 wherein tracing the path comprises acquiring data logically associated with a plurality of planes into which the network may be logically decomposed.

10. The method according to claim 1 wherein tracing the path comprises acquiring routing data for a network element in the plurality of networks and using the routing data to trace of the path.

11. The method according to claim 1 wherein tracing the path comprises determining which of the acquired data is associated with the E2E-APF path.

12. The method according to claim 1 and comprising determining which of the data associated with the E2E-APF path is associated with a same temporal instance of the E2E-APF path.

13. The method according to claim 1 wherein acquiring QoS data comprises acquiring QoS data from a network element in the networks of the plurality of networks that the E2E-APF path traverses.

14. The method according to claim 13 wherein acquiring QoS data comprises acquiring QoS data from a network element in each of the networks of the plurality of networks that the E2E-APF path traverses.

15. The method according to claim 1 wherein acquiring QoS data comprises acquiring QoS data from a network management system, or a network operating system in a network of the plurality of networks that the E2E-APF path traverses.

16. The method according to claim 1 and comprising updating the E2E-APF profile.

17. The method according to claim 1 and making the E2E-APF profile visible.

18. The method according to claim 2 and comprising monitoring changes in the QoE and performing diagnostic operations on the networks responsive to a change indicating degradation in the QoE.

19. The method according to claim 18 wherein performing diagnostic operations comprises determining a segment of the E2E-APF path causing the degradation.

20. The method according to claim 19 and comprising highlighting the segment.

21. A method of monitoring a plurality of networks, the method comprising:
    generating E2E-APF profiles according to claim 1 for each of a plurality different E2E-APF paths comprising E2E-APF paths between different pairs of applications; and
    making the E2E-APF profiles visible.

22. The method according to claim 21 and comprising correlating E2E-APF profiles associated with different E2E-APF paths.

23. The method according to claim 22 wherein correlating comprises correlating QoS data associated with different E2E-APF profiles.

24. The method according to claim 21 and comprising using the communication device and QoS data to determine a quality of experience (QoE) estimate for operation of at least one of the first and second applications associated with each of the plurality of E2E-APF paths.

25. The method according to claim 24 and comprising correlating QoE data associated with different E2E-APF profiles.

26. The method according to claim 25 and determining a network path segment common to at least two E2E-APF paths and correlating QoS or QoE data associated with the E2E-APF profiles of the at least two E2E-APF paths.

27. The method according to claim 24 and distinguishing dependence of QoE for different applications associated with the E2E-APF profiles on communication device data or QoS data.

28. The method according to claim 22 and comprising determining statistical behavior of the plurality of networks over time.

29. The method according to claim 24 and using the E2E-APF profiles to configure different packages of user services for offer to users of the plurality of networks.

30. The method according to claim 22 wherein making visible comprises making information comprised in the E2E-APF profile accessible to a network manager, management system, or operating system.

31. The method according to claim 22 wherein making visible comprises providing a visual or audio presentation of information comprised in the E2E-APF profile.

32. The method according to claim 22 wherein making visible comprises receiving data identifying a portion of the information comprised in the E2E-APF profile and making the portion visible.

33. The method according to claim 24 wherein making visible comprises highlighting a portion of an APF path according to the estimated QoE.

34. The method according to claim 24 and comprising monitoring changes in the QoE and performing diagnostic operations on the plurality of networks responsive to a change indicating degradation in the QoE.

35. A system for providing end-to-end (E2E-APF) profiles that characterize E2E-APF paths that support packet flow sessions between applications hosted on communication devices and exchanging information over a plurality of communication networks, the system comprising:
   a data collector configured to acquire communication device data associated with the communication devices and path data associated with network elements and/or communication links connecting network elements along E2E-APF paths that traverse at least two of the plurality of networks between communication devices at endpoints of the E2E-APF paths;
   an assembler configured to receive and process the data from the collector to identify communication device and path data associated with a same temporal instance of an E2E-APF path;
   an E2E-APF profile engine that processes the data associated with the E2E-APF path to provide an E2E-APF profile for the E2E-APF path; and
   a visibility projector configured to make data in the E2E-APF profile accessible for use in monitoring or managing the networks.

36. The system according to claim 35 wherein the E2E-APF profile engine is configured to correlate E2E-APF profiles associated with different E2E-APF paths.

37. The system according to claim 36 wherein the E2E-APF profile engine is configured to correlate QoS data associated with different E2E-APF profiles.

38. The system according to claim 36 wherein an E2E-APF profile generated by the system is associated with a user application and the E2E-APF profile comprises a QoE estimate for performance of the application.

39. The system according to claim 36 wherein the E2E-APF profile engine is configured to correlate QoE data associated with different E2E-APF profiles.

40. The system according to claim 36 wherein the E2E-APF profile engine is configured to determine a network path segment common to at least two E2E-APF paths and correlate QoS or QoE data associated with the E2E-APF profiles of the at least two E2E-APF paths.

41. The system according to claim 36 wherein the E2E-APF profile engine is configured to distinguish dependence of QoE for different applications associated with the E2E-APF profiles on communication device data or QoS data.

42. The system according to claim 35 wherein the E2E-APF profile engine is configured to determine statistical behavior of the plurality of networks over time.

43. The system according to claim 38 wherein the E2E-APF profile engine is configured to initiate performing diagnostic operations on a network of the plurality of networks responsive to a change indicating degradation in the QoE.

44. A method of generating an end-to-end (E2E) profile that characterizes an E2E application packet flow (E2E-APF) path between first and second applications respectively hosted on first and second communication devices and exchanging information over a plurality of communication networks, the method comprising:
   acquiring communication device data associated with at least one of the first and second communication devices;
   acquiring data logically associated with a plurality of planes into which the network may be logically decomposed
   using the data to trace an E2E-APF path traversing the plurality of networks over which packets comprising the exchanged information propagate through the plurality of networks from the first communication device to the second communication device;
   acquiring quality of service (QoS) data for at least two of the plurality of networks that the E2E-APF path traverses; and
   generating an E2E-APF profile responsive to the QoS and communication device data, and the E2E-APF path.

45. A method of generating an end-to-end (E2E) profile that characterizes an E2E application packet flow (E2E-APF) path between first and second applications respectively hosted on first and second communication devices and exchanging information over a plurality of communication networks, the method comprising:
   acquiring communication device data associated with at least one of the first and second communication devices;
   tracing an E2E-APF path traversing the plurality of networks from the first communication device to the second communication device over which packets comprising the exchanged information propagate;
   acquiring quality of service (QoS) data for at least two of the plurality of networks that the E2E-APF path traverses;
   determining which of the data associated with the E2E-APF path is associated with a same temporal instance of the E2E-APF path; and
   generating an E2E-APF profile responsive to the E2E-APF path, and QoS and communication device data associated with the same temporal instance, of the E2E-APF path.

46. A method of monitoring a plurality of networks, the method comprising:

for each of a plurality of different E2E application packet flow (E2E-APF) paths that pass through at least two of the networks and over which first and second applications hosted on first and second communication devices respectively exchange information:
    acquiring communication device data associated with at least one of the first and second communication devices;
    tracing each E2E-APF through the at least two networks it traverses;
    acquiring quality of service (QoS) data for two of the at least two networks; and
    generating an E2E-APF profile for the E2E-APF responsive to the QoS and communication device data, and the traced E2E-APF path;
determining a quality of experience (QoE) estimate for operation of at least one of the first and second applications associated with each of the plurality of E2E-APF paths;
determining a network path segment common to at least two E2E-APF paths of the plurality of paths and correlating QoS or QoE data associated with their respective profiles; and
making the E2E-APF profiles visible.

47. A method of monitoring a plurality of networks, the method comprising:
    for each of a plurality of E2E application packet flow (E2E-APF) paths that pass through at least two of the networks and over which first and second applications hosted on first and second communication devices respectively exchange information, acquiring communication device data associated with at least one of the first and second communication devices:
    tracing each E2E-APF through the at least two networks it traverses;
    acquiring quality of service (QoS) data for two of the at least two networks; and
    generating an E2E-APF profile for the E2E-APF responsive to the QoS and communication device data, and the traced E2E-APF path;
determining a quality of experience (QoE) estimate for operation of at least one of the first and second applications associated with each of the plurality of E2E-APF paths;
making a portion of an E2E-APF of the plurality of E2E-APF paths visible according to the estimated QoE; and
making the E2E-APF profiles visible.

* * * * *